US010296941B2

(12) United States Patent
Pujet et al.

(10) Patent No.: US 10,296,941 B2
(45) Date of Patent: May 21, 2019

(54) SYSTEM AND METHOD FOR OPTIMIZING CONTENT DISTRIBUTION

(75) Inventors: Nicolas Pujet, Boulder, CO (US); Chris McReynolds, Boulder, CO (US)

(73) Assignee: Level 3 Communications LLC, Broomfield, CO (US)

( * ) Notice: Subject to any disclaimer, the term of this patent is extended or adjusted under 35 U.S.C. 154(b) by 614 days.

(21) Appl. No.: 12/114,167

(22) Filed: May 2, 2008

(65) Prior Publication Data

US 2009/0276311 A1 Nov. 5, 2009

(51) Int. Cl.

*H04L 12/70* (2013.01)
*G06Q 30/02* (2012.01)
*H04L 29/08* (2006.01)

(52) U.S. Cl.

CPC ..... *G06Q 30/0251* (2013.01); *G06Q 30/0254* (2013.01); *G06Q 30/0261* (2013.01); *G06Q 30/0273* (2013.01); *H04L 67/06* (2013.01); *H04L 67/1097* (2013.01); *H04L 67/28* (2013.01); *H04L 67/2842* (2013.01); *H04L 67/32* (2013.01); *H04L 67/322* (2013.01); *H04L 67/2852* (2013.01); *H04L 67/2885* (2013.01)

(58) Field of Classification Search

USPC ........ 370/237, 248, 252; 709/221, 238–241; 705/14.49, 14.52, 14.58

See application file for complete search history.

(56) References Cited

U.S. PATENT DOCUMENTS

2003/0172163 A1 9/2003 Fujita et al.
2003/0204602 A1 10/2003 Hudson et al.
2004/0103437 A1 5/2004 Allegrezza et al.
2004/0254999 A1 12/2004 Bulleit et al.
2005/0154996 A1 7/2005 Othmer
2006/0112179 A1 5/2006 Baumeister et al.
2007/0067315 A1 3/2007 Hegde et al.
2009/0310020 A1* 12/2009 Vrijsen ........................ 348/564
2010/0312861 A1* 12/2010 Kolhi et al. ................. 709/219

FOREIGN PATENT DOCUMENTS

JP 2005026976 A 1/2005
WO WO-2002017082 A1 2/2002
WO WO-2007015183 A1 2/2007
WO WO-2008004189 A2 1/2008

OTHER PUBLICATIONS

Written Opinion of the International Searching Authority, PCT/US2009/041697, dated Dec. 17, 2009, 4 pages.
International Search Report, PCT/US2009/041697, dated Dec. 17, 2009, 3 pages.

(Continued)

*Primary Examiner* — Hoon J Chung

(57) ABSTRACT

A system for distributing content includes a content distribution platform (CDP) analysis module configured to determine an optimal combination of one or more CDP components for distributing a specified content item based on at least one content item profile. A method of distributing content includes determining an optimal combination of one or more content distribution platform (CDP) components for distributing a specified content item based on at least one content profile.

24 Claims, 8 Drawing Sheets

(56) References Cited

OTHER PUBLICATIONS

Tolga Bektas et al., *Designing Cost-effective Content Distribution Networks*, ScicenceDirect, Department of Industrial Engineering, Bilkent University 06800 Ankara, Turkey, and The University of Melbourne, VIC 3010, Australia, Computers and Operations Research 34 (2007) pp. 2436-2449, Oct. 13, 2005.
Canada Examination Report, dated Jan. 17, 2013 Application No. 2720736, 3 pgs.
Extended European Search Report, dated Mar. 17, 2014, Application No. 09739498.5, filed Apr. 24, 2009; 6 pgs.
Canadian Examination Report, dated Mar. 4, 2014, Application No. 2,720,736, filed Apr. 24, 2009; 5 pgs.
Canadian Examination Report, dated Apr. 17, 2015, Application No. 2,720,736, filed April 24, 2009; 2 pgs.
European Examination Report, dated Nov. 17, 2017, Application No. 09739498.5, filed Apr. 24, 2009; 5 pgs.
European Examination Report, dated Sep. 13, 2016, Application No. 09739498.5, filed Apr. 24, 2009; 4 pgs.

* cited by examiner

SYSTEM AND METHOD FOR OPTIMIZING CONTENT DISTRIBUTION

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever. Copyright© 2007 Level 3 Communications, LLC.

TECHNICAL FIELD

Embodiments of the present invention generally relate to content distribution. More specifically, embodiments relate to optimizing storage and distribution of content in a content distribution platform (CDP).

BACKGROUND

Demand for electronic content continues to grow. Internet users continue to request video, audio, graphics, text, digital images, and many other types of content at increasing rates. Typically, when an end user wants to retrieve content from a remote location, a request is sent from the end user's computer to another computing device (e.g., content server, cache server etc.) requesting the content. In general, the manner in which the content is delivered to the end user does not vary substantially from one type of content to another, one request to another, or from one end user to another. Typically, content is sent over a path that is essentially predetermined based on sometimes inaccurate assumptions and a relatively limited view of the larger network environment. The path over which content is sent therefore may not be the best path, according to some criteria, at a given time or for a given type of content or for other considerations.

It is with respect to these and other problems that embodiments of the present invention have been created.

SUMMARY

Embodiments of the present invention generally relate to content distribution. More specifically, embodiments relate to optimizing storage and distribution of content in a content distribution platform (CDP).

An embodiment of a system for distributing content includes a content distribution platform (CDP) analysis module configured to determine an optimal combination of one or more CDP components for distributing a specified content item based on at least one content item profile. The CDP analysis module may determine the optimal combination of one or more CDP components further based on one or more constraints. The content item profile may include an association between a selected attribute and associated attribute values for each content item of the content item type.

In some embodiments of a system the selected attribute is selected from cost, popularity, file size, file format, protocol, file transfer requirements, refresh rate, geo-regional demand, geo-global demand, user group demand, media outlet, content provider relationship, viewer demographics, whether the specified content item is to be inserted in another content item. The one or more CDP components can include one or more tiers, one or more communication modes, and one or more links. The one or more tiers may include one or more of a satellite network, a content delivery network (CDN), a peer-to-peer network, and a metropolitan aggregation point.

In various embodiments of the system the CDP includes multiple distribution tiers, distribution links with associated distribution modes. The tiers can include two or more of an end user system, a cable headend, a gateway, a metropolitan aggregation point, and a data center. The one or more CDP components may include one or more of a peer-to-peer network, a backbone network, an edge network, an origin network, a peering network, and a satellite network. The distribution links may include two or more of satellite communication, fiber link, copper wire, or wireless communication. The distribution modes can include two or more of an optical carrier (OC) level, a digital signal 1 (DS-1) transmission protocol, and a transmission level 1 (T1).

In some embodiments content item is inserted into another content item. In these embodiments the CDP analysis module can determine another optimal combination of the one or more CDP components for distributing the other content item based on at least one content item profile. The other optimal combination of the one or more components may differ from the optimal combination of the one or more CDP components for distributing the specified content item. The other content item may be of a different type than the specified content item.

An embodiment of a method of distributing content includes determining an optimal combination of one or more content distribution platform (CDP) components for distributing a specified content item based on at least one content profile. The method may further include generating the at least one content profile representative of the content item type. Generating the at least one content profile may include selecting multiple attributes associated with the content item type, for each content item of the content item type, determining respective attribute values for the selected attributes and for each content item of the content item type, associating the respective attribute values with the content item.

According to some embodiments of the method, the attributes include two or more of cost, popularity, file size, file format, protocol, file transfer requirements (e.g., format conversion, user device accommodations/adaptations, or technical requirements), refresh rate, geo-regional demand) geo-global demand, user group demand, media outlet, content provider relationship, viewer demographics, whether the specified content item is to be inserted in another content item. Determining the optimal combination of one or more CDP components is further based on one or more constraints. The one or more constraints may include one or more of bandwidth, storage capacity, power, server speed, network link capacity, one or more digital rights management (DRM) requirements, latency, jitter, reachability, delivery time, one or more peering relationships, and one or more content delivery network (CDN) architecture limitations.

In some embodiments the specified content item is a component content item to be inserted into a primary content item. The specified content item may be stored at a first tier and the primary content item may be stored at a second tier distinct from the first tier. The component content item may be an advertisement. The first tier may be selected to store the advertisement based at least in part on a geographic region that the advertisement is relevant to. Determining the optimal combination of one or more CDP components can include determining one or more network tiers to store the content item at. Determining the optimal combination of one or more CDP components may further include determining one or more distribution links for distributing the content item.

In some embodiments of the method, the one or more CDP components comprise one or more of a satellite network, a content distribution network (CDN), a peer-to-peer network, a backbone network, an edge network, and a metropolitan aggregation point. Determining the combination of one or more CDP components can include one or more of predictively determining the combination of one or more CDP components and responsively determining the combination of one or more CDP components.

Figure 1:
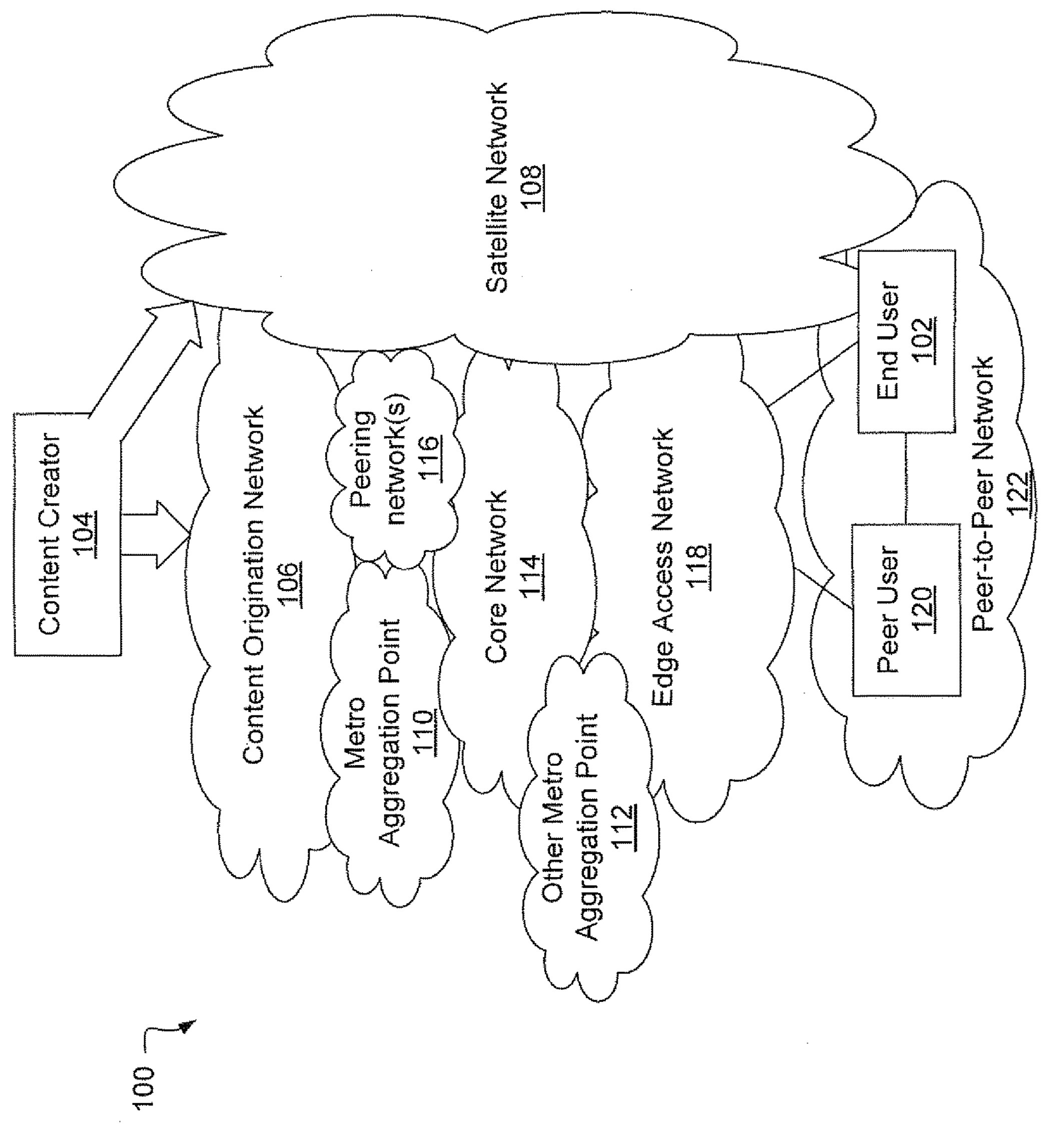
FIG. 1 illustrates an operating environment suitable for optimizing content storage and distribution in a content distribution platform (CDP) in accordance with one embodiment of the invention.

While the invention is amenable to various modifications and alternative forms, specific embodiments have been shown by way of example in the drawings and are described in detail below. The intention, however, is not to limit the invention to the particular embodiments described.

DETAILED DESCRIPTION

An embodiment of a system for distributing content includes a content distribution platform (CDP) analysis module configured to determine an optimal combination of one or more CDP components for distributing a specified content item based on at least one content item profile.

An embodiment of a method of distributing content includes determining an optimal combination of one or more content distribution platform (CDP) components for distributing a specified content item based on at least one content profile.

Prior to describing one or more preferred embodiments of the present invention, definitions of some terms used throughout the description are presented.

Definitions

The term "content" refers to any type of electronic data that can be communicated over a communication network, including, but not limited to, text, audio, video, graphics, and pictures.

A "content item" or "item of content" is a unit of content that can be requested. For example, a content item may be a file. In response to a request for a content item, portions of the content item may be retrieved from one or more locations.

The term "tier", "network tier", "layer", "network layer" and similar terms refers to a major point in a network or networks. A layer is typically a point of data origination, convergence, aggregation, or destination. For example, a network layer may be an Internet service provider (ISP) network, backbone network, origination network, edge access network, peer device, core network, destination network, metropolitan aggregation point, colocation center, or peering networks.

A "module" is a self-contained functional component. A module may be implemented in hardware, software, firmware, or any combination thereof.

The terms "connected" or "coupled" and related terms are used in an operational sense and are not necessarily limited to a direct connection or coupling.

The phrases "in one embodiment," "according to one embodiment," and the like generally mean the particular feature, structure, or characteristic following the phrase is included in at least one embodiment of the present invention, and may be included in more than one embodiment of the present invention. Importantly, such phases do not necessarily refer to the same embodiment.

If the specification states a component or feature "may", "can", "could", or "might" be included or have a characteristic, that particular component or feature is not required to be included or have the characteristic.

The terms "responsive" and "in response to" includes completely or partially responsive.

The term "computer-readable media" is media that is accessible by a computer, and can include, without limitation, computer storage media and communications media. Computer storage media generally refers to any type of computer-readable memory, such as, but not limited to, volatile, non-volatile, removable, or non-removable memory. Communication media refers to a modulated signal carrying computer-readable data, such as, without limitation, program modules, instructions, or data structures.

Exemplary System

FIG. 1 illustrates and exemplary content distribution platform (CDP) 100 over which content can be stored and distributed to one or more end-users 102. The CDP 100 includes one or more CDP components. CDP components typically include network tiers and content communication links. For example, CDP components may include one or more of each of an end-user 102, a content creator 104, a content origination network 106, a satellite network 108, a metropolitan aggregation point 110, other metro aggregation point(s) 112, a core network 114, a peering network 116, an edge access network 118, a peer user device 120 in a peer-to-peer network 122.

Content, such as, but not limited to video, audio, text, graphics, executables, pictures, and games, may be communicated to an end user, such as the end user 102 by one or more CDP components. Typically, an end user device of the end user 102 issues a request for selected content. The request is routed to one or more CDP components and eventually reaches a server or other computing device that can communicate (e.g., serve) at least a portion of the requested content to the end user 102. This processing may involve redirecting the end user device or the request to one or more possible sources of the requested content.

The requested content may be stored at one or more source locations throughout the CDP 100. Copies of the content (or portions thereof) can be stored at multiple different locations where they can be served quickly or more efficiently to different requesting users, depending on the locations of the users. In this regard, it should be noted that the term "content origination network" 106 does not mean that requested content is always stored at, or retrieved from, the content origination network 106. The content origination network 106 merely means that the content from the content creator 104 may be initially published or uploaded to the content origination network 106. After the content is initially published or uploaded, the content may be stored (e.g., cached) at different locations in the CDP 100. However, the content may be initially communicated from the creator 104 to the satellite network 108, where it may transmitted to the end user 102 or any other network level within the environment 100. Copies of content or portions thereof can be stored at one or more of the network locations, a peer device 120 in the peer-to-peer network 122, or even the device of the end user 102.

In accordance with various embodiments, the storage component(s) where a content item is stored, and from where it is retrieved, is determined in a way that satisfies one or more rules or criteria. In some embodiments, this may involve optimizing one or more criteria (e.g., optimization criteria). The manner or mode of communicating content (and content requests) through the CDP 100 can also be determined. For example, the content request and the requested content are communicated through one or more CDP 100 components via one or more communication links that can be selected based on rules or criteria. As just one example, the content may be served from the origination network 106 through the satellite network 108 via one or more communication links, such as, but not limited to, satellite communication, fiber line, copper wire, and wireless (e.g., cellular, WiFi).

The CDP 100 may or may not include a conventional "content delivery network" (CDN). Determination of CDP 100 components may include determining whether to store a content item within, or communicate a content item from or through, a CDN. While embodiments described herein may be applied to a CDN environment, the embodiments are more generally applicable to any platform for communicating content. For example, whereas a CDN may be defined with a fixed network and delivery link, embodiments herein relate to content distribution platforms where network tiers and communication links can be selected for content storage and distribution. As such, the components used within a CDP for content storage and distribution may be variable depending on one or more factors, such as, but not limited to, content type, content size, demand, popularity, age, churn, or others.

The network tiers and communication links may or may not be provided, maintained or operated by a single service provider. In various embodiments, numerous service providers may make up the CDP 100. Depending on the CDP components owned or operated by a given provider, the provider may or may not be able to select the tiers or links discussed herein. However, within a given set of tiers and communication links, a provider can use the embodiments described herein to choose a CDP component set according to one or more rules or optimization criteria. In some embodiments, multiple providers could work together to select CDP components.

The determination of where to store content and/or how to communicate the content can depend on one or more variables. In one embodiment, the content storage and communication determination depends at least in part on the type of content. The determination may be based on a content profile associated with the content type. In this embodiment, content profiles can be generated for one or more content types. The content profile associates attribute values with content items of the content type. Attribute values are values of attributes of interest, such as, but not limited to demand, size and refresh rate. An exemplary depiction of a content profile is shown and discussed below.

In accordance with various embodiments, the determination of CDP 100 components for storing and/or communicating a content item may be predictive or responsive, or a combination thereof. Predictive determination refers to determining the one or more CDP 100 components "a priori" or prior to a request being made for the content. Responsive determination refers to determining the one or more CDP 100 components after, or in response to, an issued request for a content item. A combination of the two approaches may involve adapting the predictive determination based on analysis of various criteria in relation to the communication of content. A combination of the two approaches may alternatively involve predictively determining a portion of the distribution path and responsively determining another portion of the distribution path.

The one or more CDP components 100 may be selected according to one or more optimization criteria. The one or more optimization criteria may include cost, net present value, speed or others. The optimization can take into account constraints associated with possible content distribution paths, infrastructure, technologies and storage locations. For example, at each network tier, such as in the edge access network, there are typically constraints associated with electric power, storage capacity, server capacity, bandwidth, and others. Cost (or other criteria) may be more or less, depending on the magnitude of the various constraints for a given set of content.

Figure 2:
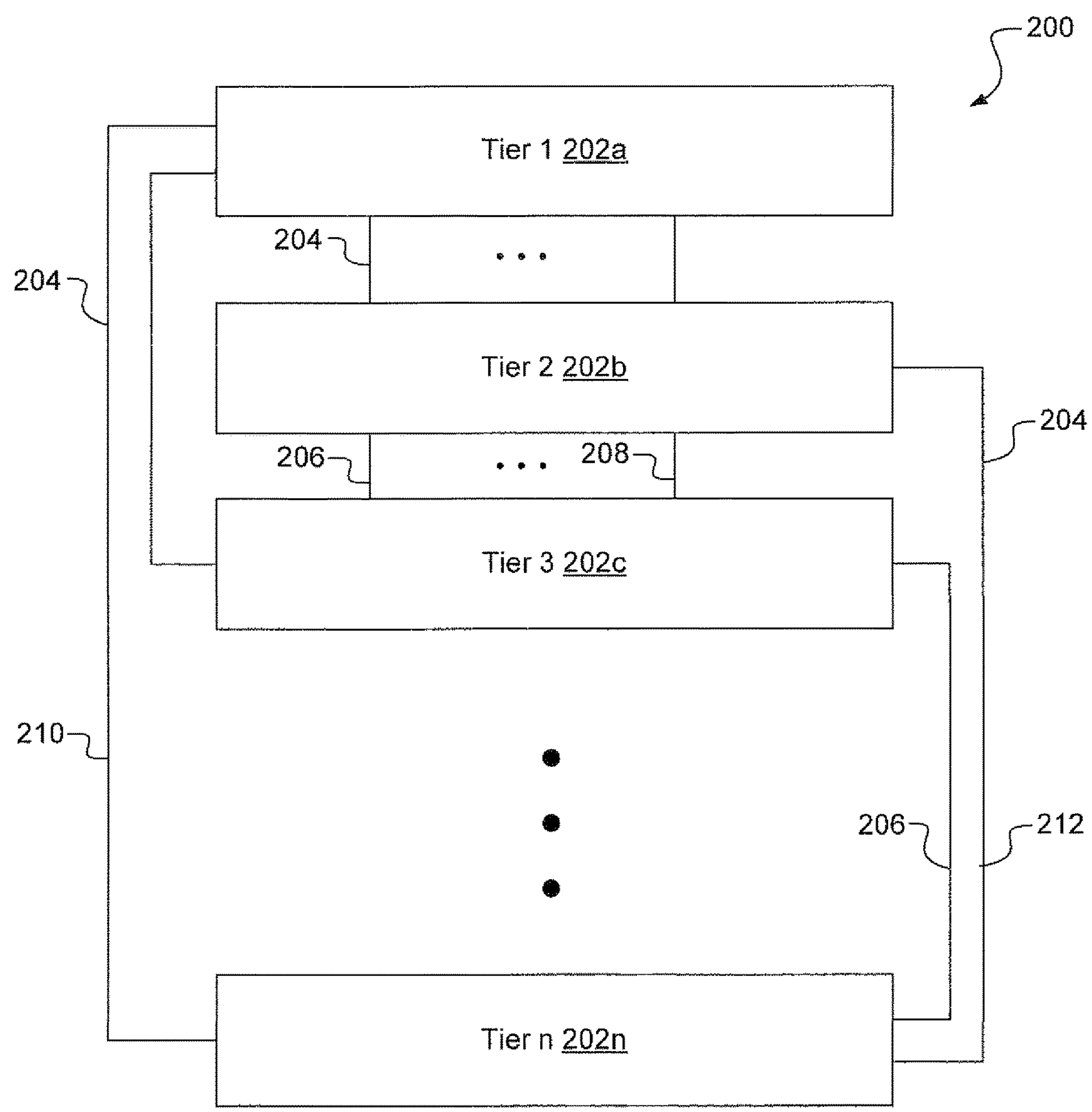
FIG. 2 illustrates a model of a CDP having multiple tiers where content can be distributed and/or stored in accordance with one embodiment of the invention.

FIG. 2 illustrates multiple network tiers 202 and communication links 204 that are examples of components that may be part of a CDP. The communication links 204 communicatively couple tiers 202 together. In general, each tier 202 may provide content storage and retrieval functions, and may include one or more servers, data stores, or other computing/storage devices. Examples of network tiers are, without limitation, cable headend, gateway, metropolitan aggregation point, data center and end user systems. Examples of communication links 204 include, without limitation, fiber, peer-to-peer, wireless (e.g., cellular, WiFi, IEEE 802.11), and copper links. Links 204 generally provide one or more associated communication modes, such as, without limitation, optical carrier (OC) levels, digital signal (DS) schemes, and transmission levels (e.g., T1).

In some embodiments, tier 1 (202*a*) represents a content origination point and tier n (202*n*) represents an end user system. Intermediate tiers (e.g., 202*b*, 202*c*, . . . ) may represent other systems, such as, but not limited to, devices in core networks, edge networks, metro aggregation points, peering networks, or satellite networks. There may be one or more communication links connecting any two tiers. For example, a wireless link 206 may link tier 2 (202*b*) with tier 3 (202*c*). In addition to the wireless link 206, a fiber line 208 may link tier 2 (202*b*) with tier 3 (202*c*). Other communication links may exist, as depicted by ellipses. Cost, net present value (NPV), performance, or other criteria can vary, depending upon which tiers and links are used to store and distribute content.

Embodiments of a CDP component determination system can determine which tier or tiers 202 to store content items on and which communication link or links 204 to communicate requested content over. The determination can be made based, at least in part, on a content profile. Selection of CDP components typically depends upon constraints, which may be network constraints or other constraints. Selection of CDP components may also be based on additional information, such as customer demographics. Further, the determination may be made in such a way as to optimize one or more criteria, such as cost or net present value (NPV).

In accordance with various embodiments, for a given content item, it may be optimal to store the content item a number of tiers away from an end user. A requested content item may be routed through one or more network tiers 202 via one or more communication links 204 to the end user. For example, a content item may be communicated from tier 1 (202*a*) to tier n (202*n*) via one or more of tier 2 (202*b*), tier 3 (202*c*), or others. The content item may be routed over a fiber link between tier 1 (202*a*) and tier 2 (202*b*), a copper line between tier 2 (202*b*) and tier 3 (202*c*), and other communication modes to other tiers until the content reaches the end user.

In addition, from one or more of the tiers 202, a requested content item may be communicated directly to the end user if a communication link exists directly to the end user from a given tier 202. For example, a satellite link 210 may link tier 1 (202*a*) directly to tier n (202*n*), whereby a requested content item can be communicated directly from tier 1 (202*a*) to tier n (202*n*) without being routed through any intermediate tiers. Alternatively, a requested content item in route to tier n (202*n*) could be routed to an intermediate tier, such as tier 2 (202*b*) and then directly on to tier n (202*n*) via a direct link 212.

Accordingly, components of the CDP 200 can be selected for storage and distribution of content, in order to satisfy one or more criteria. CDP components may be selected based on one or more attributes of a given content item. The determination of CDP components may depend on content type, attribute values, network model, constraints or other factors, such as user demographics. In addition, the entity that owns and/or operates the CDP components may be a determinant of selected CDP components.

Figure 3:
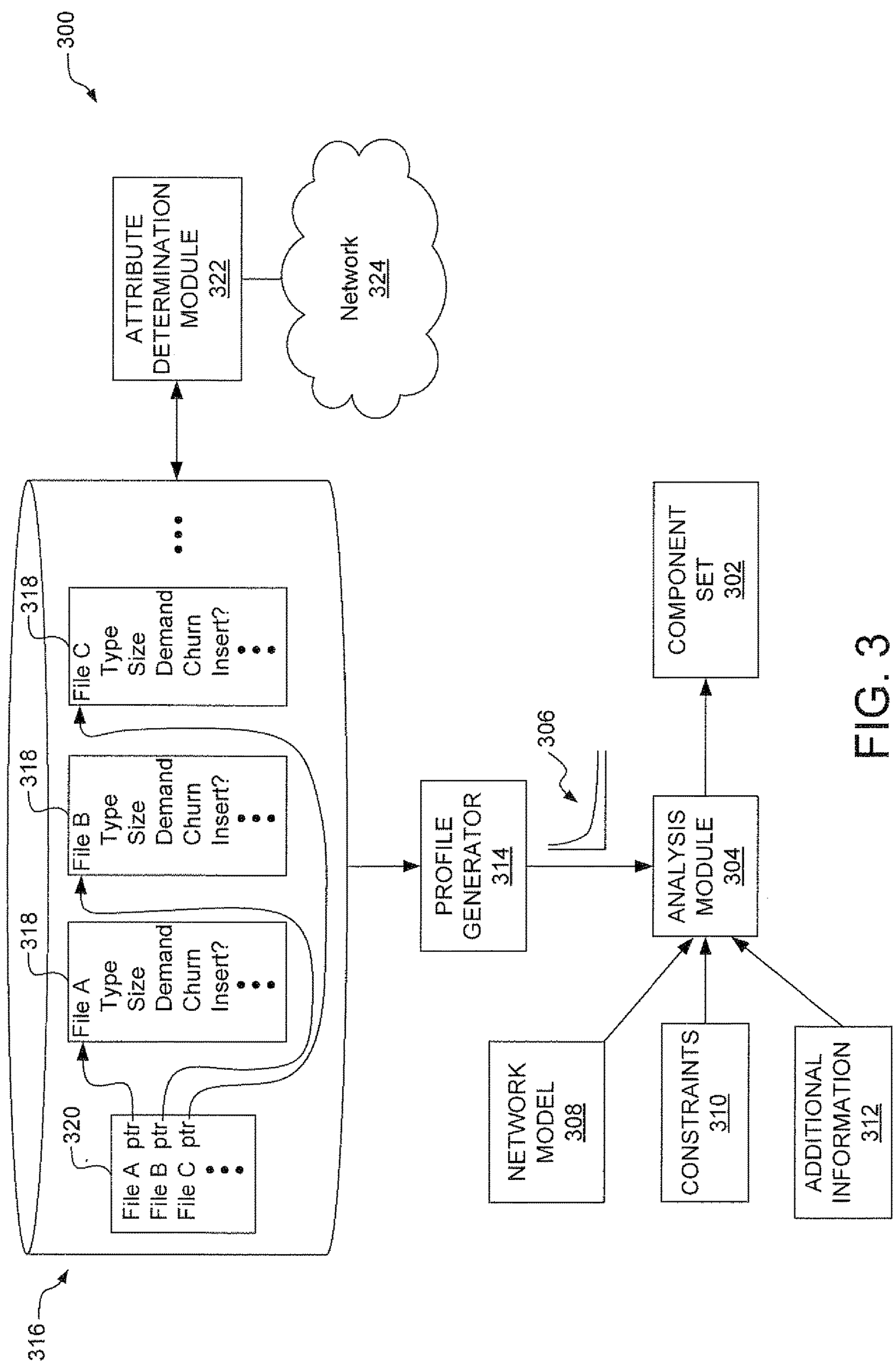
FIG. 3 illustrates a content storage and distribution optimization system in accordance with an embodiment of the invention.

FIG. 3 illustrates a CDP component determination system 300 for determining a set of CDP components 302 for storing and distributing content items in a CDP. The system 300 includes an analysis module 304 that generates the CDP component set 302 based at least in part on one or more content profiles 306. The analysis module 304 may also use one or more of a network model 308, one or more constraints 310, and additional information 312 in determining the CDP component set 302. The additional information 312 can include customer demographic information, service provider information or others.

In one embodiment, one or more content profiles 306 are generated by a profile generator 314. The profile generator 314 uses content item attributes to generate the profile(s) 306. The content item attributes may be stored in a data store 316. For example, attributes for content items, file A, file B and file C, can be stored in respective attribute files 318. An attribute index file 320 references attribute files 318 of the content items. In this embodiment, the profile generator 314 reads pointers or other file references in the attribute index file 320 to identify the attributes of a given file.

Of course, the data store 316 can store data in any manner, such as, but not limited to, hierarchical, flat file, or object oriented. As such, the attribute data could be stored in any number of ways other than that shown in FIG. 3. The attribute data can be set by an attribute determination module 322. The attribute determination module 322 accesses network-based resources or other resources that provide information relevant to the attributes of interest. For example, the attribute determination module 322 can determine the size, demand, popularity, churn or other attributes related to content items.

In one embodiment, each profile 306 relates an attribute to files of a given file type. For example, a profile may relate all the movie files in a library of movies to their respective sizes. Another profile may relate the movies according to popularity or churn. The analysis module 304 can apply rules to the profile(s) 306, constraints 310, network model 308 and additional data 312 to select a combination of CDP components that meet one or more criteria. For example, depending on the sizes of different files and the storage capacity at different network tiers, cost may be minimized by selectively storing files nearer to the end users.

Figure 4:
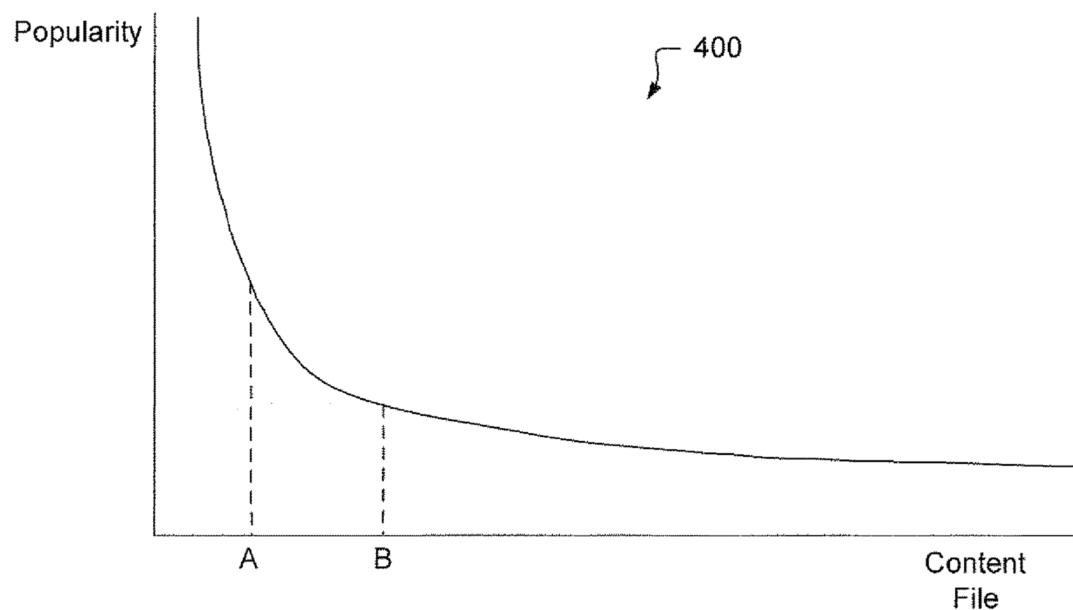
FIG. 4 is a graphical representation of a content profile.

FIG. 4 is a graphical representation of a content profile 400 that may be generated and used in accordance with one embodiment for determining a set of CDP components for storing and distributing content items. The particular profile 400 relates popularity to content items. In this embodiment, the Y-axis has popularity values and the X-axis has content item identifiers (e.g., file names). The files identified on the X-axis may relate to a file type; e.g., Netflix® movie library. In the particular example illustrated, file A has a higher popularity that file B.

The popularity may be global popularity, regional popularity, or popularity within a designated group; e.g., a demographically defined group. For example, the popularity may relate to popularity of the files among all males aged 18 to 24.

Profiles are not limited to popularity. Other attributes are, without limitation, file cost, file size, file format, protocol, file transfer requirements (e.g., format conversion, user device accommodations/adaptations, or technical requirements), refresh rate, geo-regional demand, geo-global demand, user group demand, media outlet, content provider relationship, viewer demographics, or whether the specified content item is to be inserted in another content item.

The attribute selected for the profile may depend on the criteria that are to be optimized. For example, if net present value (NPV) is to by maximized, cost and demand attributes may be most relevant to the analysis. If cost is to be minimized, file cost, file transfer requirements or churn might be most relevant. In various embodiments, a user can configure the attributes to be profiled for given file sets.

Exemplary Operations

Figure 5:
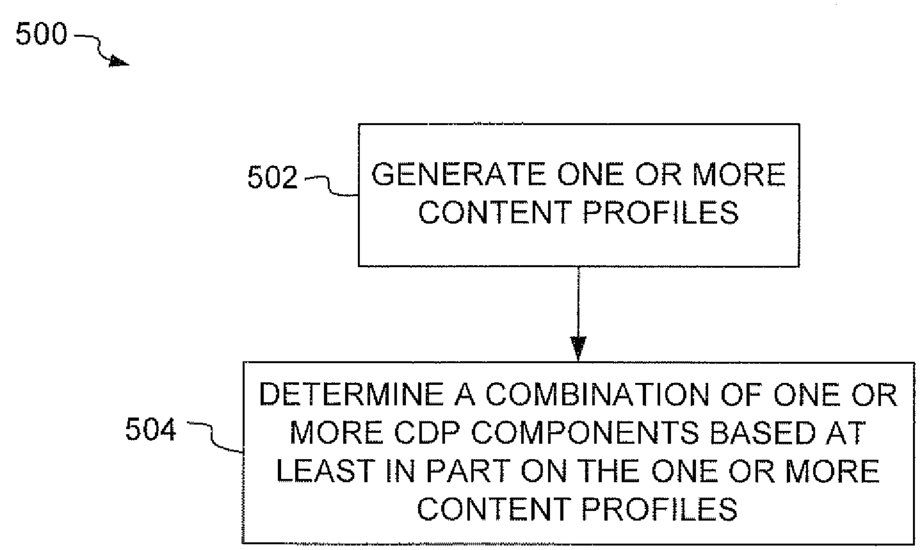
FIGS. 5-7 are flowcharts illustrating algorithms for carrying out content storage and distribution optimization in accordance with embodiments of the invention.

FIG. 5 is a flow chart illustrating a high level CDP component determination algorithm 500 for determining a combination of CDP components to be employed for distribution of content items. In a generating operation 502, one or more content profiles are generated. In one embodiment, a content profile is a profile of a set of content items (e.g., files) with reference to a given attribute. The set of content items may be designated by a particular type. For example, the set of content items may be all movies in a given movie library. Attributes may be size, demand (e.g., total demand or demand within a category of customers), churn, popularity, cost, etc.

Multiple profiles may be generated. For example, for given set of content items, a profile may be generated for each of multiple attributes. As another example, a profile may be generated for each of multiple different sets of content items over the same attribute. Of course, any combination of profiles can be generated. An example embodiment of the generating operation 502 is shown in FIG. 6 and discussed below.

In a determining operation 504, a combination of CDP components is determined, based at least in part on the one or more content item profiles. The determining operation 504 implements one or more functions that relate content item attributes to relevant criteria, such as cost. Attribute values of a given file or type of file, for example, can be a determinant in cost of storage or distribution of the file.

Figure 6:
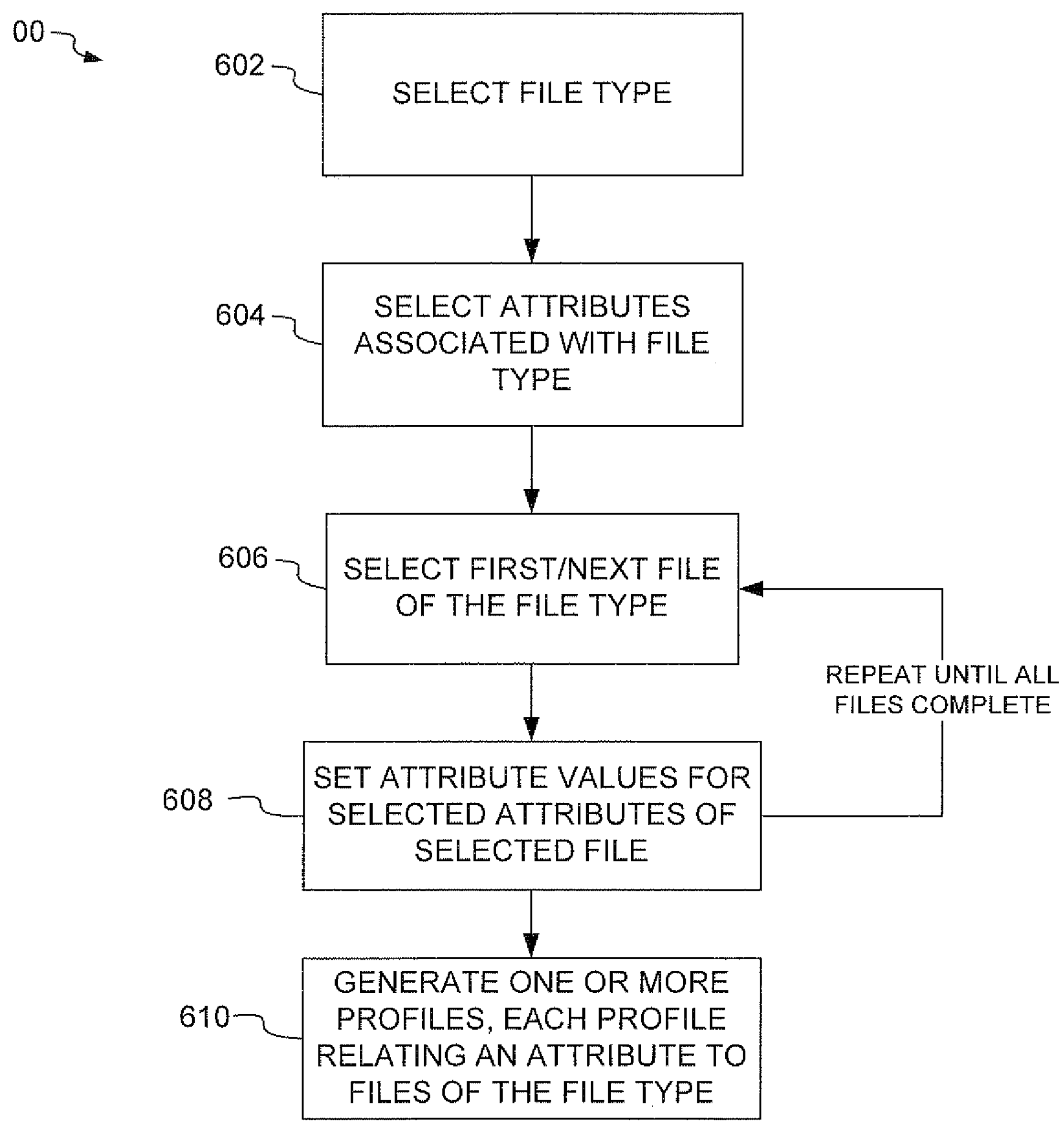

FIG. 6 is a flow chart illustrating a content profile generation algorithm 600 for generating one or more content profiles. In a selecting operation 602, a file type is selected that designates a set of files over which the one or more content profiles will be generated. An example of a file type may be movies, or movies in a selected library, such as the Netflix® movie library. Other file types include, for example, advertisements, files to be inserted in other files, text, audio, interactive web sites, and others.

In another selecting operation 604, one or more attributes of interest are selected that may be associated with the selected file type. Example attributes include, for example, cost, popularity, file size, file format, protocol, file transfer requirements (e.g., format conversion, user device accommodations/adaptations, or technical requirements), refresh rate, geo-regional demand, geo-global demand, user group demand, media outlet, content provider relationship, viewer demographics, or whether the specified content item is to be inserted in another content item.

In another selecting operation 606, a first file of the file type is selected. In a setting operation 608, attribute values are set for each of the selected attributes of interest for the first file. The setting operation 608 may involve determining the attribute values, for example, by looking up the attribute values from a database, or calculating values. For example, a measure of demand for the file may be determined based on a number of "web hits" for the file, or revenue garnered from the file. Such data may be maintained at publicly available web sites. Other publicly or privately available sources of data may be referenced in order to determine attribute values of many types. In some cases, the setting operation 608 may set attribute values based on a heuristic or generally known facts.

The setting operation 608 typically records the attribute values in relation to the selected file. After the attribute values are set for the first file, the algorithm returns to the selecting operation 606 where the next file of the file type is selected. The same attribute values are set for the next selected file. This continues until all files of the file type have attribute values set for the respective one or more attributes of interest. One or more profiles are then generated in a generating operation 610.

In one embodiment, the generating operation 610 orders the file names by attribute value for a selected attribute. The order may be from highest to lowest, or some other order and may depend on the attribute. For example, if demand is the selected attribute, the file names may be ordered according to decreasing demand from greatest to smallest. As another example, files can be ordered according to file size, cost, churn, popularity, or others. In some embodiments, a user is able to select which profiles are generated in the generating operation 610. For example, for a given file type, it may be that file demand, cost and churn are the most relevant attributes, and only those profiles need to be generated.

Figure 7:
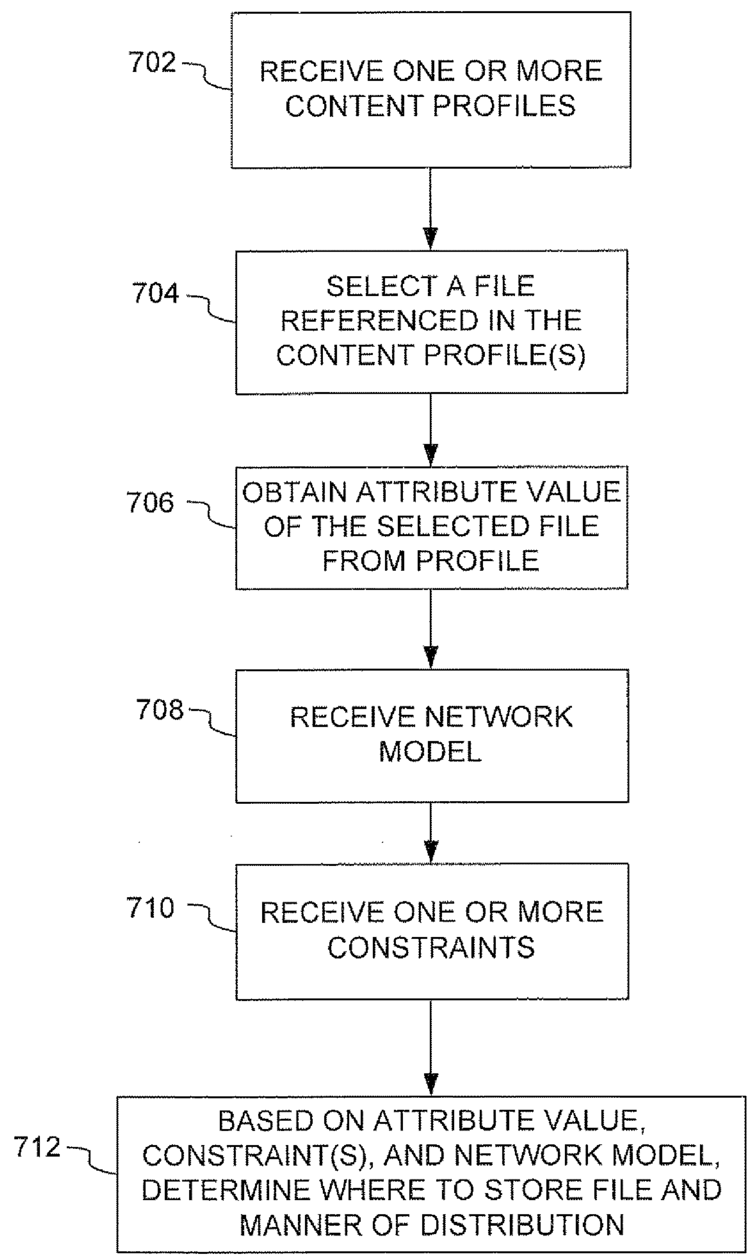

FIG. 7 is a flow chart illustrating details of a CDP component determination algorithm 700 for determining storage and distribution components for one or more content items (e.g., files). In a receiving operation 702, one or more content profiles are received. Receiving operation 702 may involve retrieving the content profile(s) from a specified memory location, receiving the profile(s) in a communication (e.g., email), or otherwise. Typically, each of the one or more content profiles will be representative of a file type with respect to an attribute.

A selecting operation 704 selects a file in the file type associated with one or more of the content profile(s). The selecting operation 704 may select the file based on a predetermined order of selection; e.g., alphabetically by filename, or according to attribute value. Alternatively, or in addition, the file may be selected based on user input.

An obtaining operation 706 obtains one or more attribute values from the respective content profiles for the selected file. The one or more attribute values that are obtained may depend on a function that is to be carried out to determine the CDP components, or the values may be specified by a user or in another file. For example, one profile may relate to demand, another may relate to churn, and another may relate to file size. All three of these attribute values may read, or fewer than all three.

In a receiving operation 708, a network model is received. The network model is a model of a portion of a content distribution platform (CDP) that the file with be distributed by. The model represents components of the CDP, such as network tiers and communication links. The model typically also includes communication modes, such as optical carrier levels, DS levels, and transmission level (e.g., T1). The receiving operation 708 may read the network model from a designated file or memory location.

In another receiving operation 710, one or more constraints are received. The constraints may be network constraints or other constraints. For example, constraints may include, without limitation, cost, storage capacity, bandwidth, power, server speed, network link capacity, one or more digital rights management (DRM) requirements, latency, jitter, reachability, delivery time, one or more peering relationships, and one or more content delivery network (CDN) architecture limitations. In another receiving operation 712, additional information, such as demographic information are received. The additional information and the constraints may be read from a designated file or received from another module that generates such information.

In a determining operation 914, CDP components are determined for storing and distributing the file based at least in part on the network model, the one or more constraints and the one or more profiles. The determination may also be based on at least some of the additional information, such as demographics of content viewers.

In one embodiment, the determining operation 914 optimizes one or more optimization functions. Optimization functions can relate a value to be optimized, such as cost or net present value (NPV), to a numerical combination of the constraints and attribute values, which may depend upon where the file is stored and how it is distributed. For example, an optimization function may seek to minimize cost, based on a function of constraints and attribute values. If the size of the file is very large, a constraint at one possible storage location may make storage at that location cost prohibitive, given the large file size. As another example, if demand is very high for a file in a given town, for example, the per unit cost or the NPV may be optimized by storing the file at an edge network in the town and direct all requests for that file to the edge network.

Exemplary Computing Device

Figure 8:
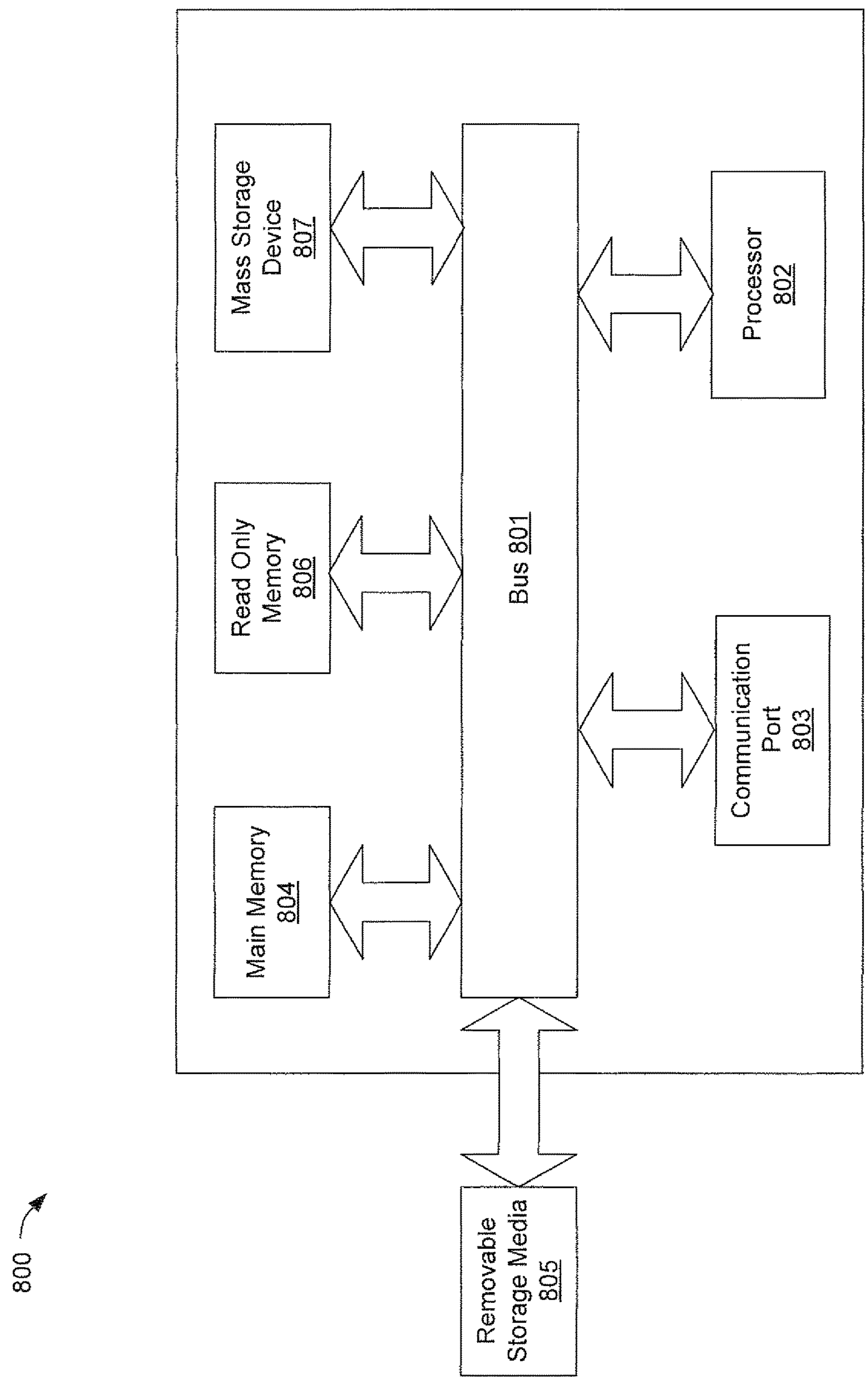
FIG. 8 illustrates a general purpose computing device upon which one or more aspects of embodiments of the present invention may be implemented.

FIG. 8 is a schematic diagram of a computing device 800 upon which embodiments of the present invention may be implemented and carried out. For example, one or more computing devices 800 may be used to analyze or generate content profiles, generate a CDP component set, and/or determine content attributes for use in generating content profiles. As discussed herein, embodiments of the present invention include various steps or operations. A variety of these steps may be performed by hardware components or may be embodied in machine-executable instructions, which may be used to cause a general-purpose or special-purpose processor programmed with the instructions to perform the operations. Alternatively, the steps may be performed by a combination of hardware, software, and/or firmware.

According to the present example, the computing device 800 includes a bus 801, at least one processor 802, at least one communication port 803, a main memory 804, a removable storage media 705, a read only memory 806, and a mass storage 807. Processor(s) 802 can be any know processor, such as, but not limited to, an Intel® Itanium® or Itanium 2® processor(s), AMD® Opteron® or Athlon MP® processor(s), or Motorola® lines of processors. Communication port(s) 803 can be any of an RS-232 port for use with a modem based dialup connection, a 10/100 Ethernet port, a Gigabit port using copper or fiber, or a USB port. Communication port(s) 803 may be chosen depending on a network such a Local Area Network (LAN), Wide Area Network (WAN), or any network to which the computing device 800 connects. The computing device 800 may be in communication with peripheral devices (not shown) such as, but not limited to, printers, speakers, cameras, microphones, or scanners.

Main memory 804 can be Random Access Memory (RAM), or any other dynamic storage device(s) commonly known in the art. Read only memory 806 can be any static storage device(s) such as Programmable Read Only Memory (PROM) chips for storing static information such as instructions for processor 802. Mass storage 807 can be used to store information and instructions. For example, hard disks such as the Adaptec® family of SCSI drives, an optical disc, an array of disks such as RAID, such as the Adaptec family of RAID drives, or any other mass storage devices may be used.

Bus 801 communicatively couples processor(s) 802 with the other memory, storage and communication blocks. Bus 801 can be a PCI/PCI-X, SCSI, or USB based system bus (or other) depending on the storage devices used. Removable storage media 805 can be any kind of external hard-drives, floppy drives, IOMEGA® Zip Drives, Compact Disc-Read Only Memory (CD-ROM), Compact Disc-Re-Writable (CD-RW), Digital Video Disk-Read Only Memory (DVD-ROM).

Embodiments of the present invention include various steps, which will be described in this specification. The steps may be performed by hardware components or may be embodied in machine-executable instructions, which may be used to cause a general-purpose or special-purpose processor programmed with the instructions to perform the steps. Alternatively, the steps may be performed by a combination of hardware, software and/or firmware.

Embodiments of the present invention may be provided as a computer program product, which may include a machine-readable medium having stored thereon instructions, which may be used to program a computer (or other electronic devices) to perform a process. The machine-readable medium may include, but is not limited to, floppy diskettes, optical disks, compact disc read-only memories (CD-ROMs), and magneto-optical disks, ROMs, random access memories (RAMs), erasable programmable read-only memories (EPROMs), electrically erasable programmable read-only memories (EEPROMs), magnetic or optical cards, flash memory, or other type of media/machine-readable medium suitable for storing electronic instructions. Moreover, embodiments of the present invention may also be downloaded as a computer program product, wherein the program may be transferred from a remote computer to a requesting computer by way of data signals embodied in a carrier wave or other propagation medium via a communication link (e.g., a modem or network connection).

Various modifications and additions can be made to the exemplary embodiments discussed without departing from the scope of the present invention. For example, while the embodiments described above refer to particular features, the scope of this invention also includes embodiments having different combinations of features and embodiments that do not include all of the described features. Accordingly, the scope of the present invention is intended to embrace all such alternatives, modifications, and variations together with all equivalents thereof.

What is claimed is:

1. A system comprising:

a data store including at least one non-transitory computer readable medium, the non-transitory computer readable medium including at least one content item profile; and at least one processor in communication with the data store, the at least one processor accessing at least one memory including computer executable instructions to perform the operations of:

receiving the at least one content item profile from the data store, and determining an optimal combination of at least two or more CDP components for distributing a specified content item based on the received at least one content item profile, wherein the specified content item is inserted into another content item, wherein the at least two or more CDP components comprise a plurality of distribution tiers and distribution links with associated distribution modes, and wherein the at least two or more CDP components comprise at least one or more of a peer-to-peer network, a backbone network, an edge network, an origin network, a peering network, and a satellite network.

2. The system of claim 1, wherein the computer executable instructions further perform the operation of determining the optimal combination of at least two or more CDP components based on one or more constraints.

3. The system of claim 1, wherein the at least one content item profile comprises an association between a selected attribute and associated attribute values for a plurality of content items of a content item type.

4. The system of claim 3, wherein the selected attribute is selected from the group consisting of cost, popularity, file size, file format, protocol, file transfer requirements, refresh rate, geo-regional demand, geo-global demand, user group demand, media outlet, content provider relationship, viewer demographics, and whether the specified content item is to be inserted in another content item.

5. The system of claim 1, wherein the at least two or more CDP components comprise one or more tiers, one or more communication modes, and one or more links.

6. The system of claim 5, wherein the one or more tiers comprise one or more of a satellite network, a content delivery network (CDN), a peer-to-peer network, and a metropolitan aggregation point.

7. The system of claim 1, wherein the plurality of distribution tiers comprises two or more of an end user system, a cable headend, a gateway, a metropolitan aggregation point, and a data center.

8. The system of claim 1, wherein the distribution links comprise two or more of satellite communication, fiber link, copper wire, or wireless communication.

9. The system of claim 1, wherein the associated distribution modes comprise two or more of an optical carrier (OC) level, a digital signal 1 (DS-1) transmission protocol, and a transmission level 1 (T1).

10. The system of claim 1, wherein the computer executable instruction further perform the operations of determining another optimal combination of at least one or more CDP components for distributing the other content item based on the received at least one content item profile.

11. The system of claim 10, wherein the other optimal combination of at least one or more CDP components differs from the optimal combination of at least two or more CDP components for distributing the specified content item.

12. The system of claim 10, wherein the other content item is of a different type than the specified content item.

13. A method comprising:

accessing a data store storing at least one content profile;

receiving the at least one content profile; and determining, using the at least one processor, an optimal combination of at least two or more content distribution platform (CDP) components for distributing a specified content item based on the received at least one content profile, wherein determining the optimal combination of at least two or more CDP components is further based on one or more constraints, wherein the specified content item is a component content item to be inserted into a primary content item and is stored at a first tier and the primary content item is stored at a second tier distinct from the first tier, and wherein the at least two or more CDP components comprise one or more of a satellite network, a content distribution network (CDN), a peer-to-peer network, a backbone network, an edge network, and a metropolitan aggregation point.

14. The method as recited in claim 13, further comprising:

generating the at least one content profile representative of a content item type and;

storing the at least one content profile in the data store.

15. The method as recited in claim 14, wherein generating the at least one content profile comprises:

selecting, using the at least one processor, a plurality of attributes associated with the content item type;

for each content item of the content item type, determining respective attribute values for the selected attributes; and for at least two content items of the content item type, associating the respective attribute values.

16. The method as recited in claim 15, wherein the plurality of attributes comprises two or more of cost, popularity, file size, file format, protocol, file transfer requirements, refresh rate, geo-regional demand, geo-global demand, user group demand, media outlet, content provider relationship, viewer demographics, and whether the specified content item is to be inserted in another content item.

17. The method as recited in claim 13, wherein the one or more constraints are selected from the group consisting of:

bandwidth; storage capacity; power; server speed; network link capacity;

one or more digital rights management (DRM) requirements; latency;

jitter; reachability; delivery time; one or more peering relationships; and one or more content delivery network (CDN) architecture limitations.

18. The method as recited in claim 13, wherein the component content item is an advertisement.

19. The method as recited in claim 18, further comprising:

selecting the first tier to store the advertisement based at least in part on a geographic region that the advertisement is relevant to.

20. The method as recited in claim 13, wherein determining the optimal combination of at least two or more CDP components comprises determining one or more network tiers to store the specified content item at.

21. The method as recited in claim 13, wherein determining the optimal combination of at least two or more CDP components further comprises determining one or more distribution links for distributing the specified content item.

22. The method as recited in claim 13, wherein determining the optimal combination of at least two or more CDP components comprises one or more of predictively determining the optimal combination of at least two or more CDP components and responsively determining the optimal combination of at least two or more CDP components.

23. A system comprising:

at least one processor in communication with a tangible computer readable medium comprising attribute values for a plurality of content items, the at least one processor accessing at least one memory including computer executable instructions to perform the operation of accessing the data store to generate at least one content item profile comprising an association between respective attribute values of at least two of the plurality of content items; and determining an optimal CDP component for distributing a specified content item based on the at least one content item profile, wherein the computer executable instructions to further perform the operation of determining the optimal CDP component based on one or more constraints, wherein the optimal CDP component comprises one of a satellite network, a content delivery network (CDN), a peer-to-peer network, and a metropolitan aggregation point, and wherein the plurality of content items is associated with a content item type.

24. The system as recited in claim 23, wherein each attribute value is associated with an attribute selectable from a group comprising cost, popularity, file size, file format, protocol, file transfer requirements, refresh rate, geo-regional demand, geo-global demand, user group demand, media outlet, content provider relationship, viewer demographics, and whether the specified content item is to be inserted in another content item.

* * * * *